US010540345B2

(12) United States Patent
Huang et al.

(10) Patent No.: US 10,540,345 B2
(45) Date of Patent: Jan. 21, 2020

(54) REDUCING CHURN IN KNOWLEDGE GRAPHS

(71) Applicant: Microsoft Technology Licensing, LLC, Redmond, WA (US)

(72) Inventors: Chiyuan Huang, Bellevue, WA (US); Arnab Sinha, Issaquah, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 423 days.

(21) Appl. No.: 15/374,962

(22) Filed: Dec. 9, 2016

(65) Prior Publication Data

US 2018/0165352 A1  Jun. 14, 2018

(51) Int. Cl.
G06F 16/23 (2019.01)
G06F 16/901 (2019.01)

(52) U.S. Cl.
CPC ...... *G06F 16/2379* (2019.01); *G06F 16/9024* (2019.01)

(58) Field of Classification Search
None
See application file for complete search history.

(56) References Cited

U.S. PATENT DOCUMENTS

| 6,185,558 B1 | 2/2001 | Bowman et al. |
| 9,390,174 B2 | 7/2016 | Zhou et al. |
| 2012/0311036 A1* | 12/2012 | Huhn .............. G06Q 10/10 709/204 |
| 2013/0291019 A1* | 10/2013 | Burkitt ............ H04N 21/4828 725/53 |
| 2014/0280114 A1 | 9/2014 | Keysar et al. |
| 2014/0280307 A1* | 9/2014 | Gupta ............. G06F 16/3331 707/769 |
| 2015/0269231 A1 | 9/2015 | Huynh et al. |
| 2015/0286747 A1 | 10/2015 | Knastasakos et al. |

(Continued)

OTHER PUBLICATIONS

Bollegala et al., Automatic Discovery of Personal Name Aliases from the Web, IEEE Transactions on Knowledge and Data Engineering, vol. 23, No. 6, Jun. 2011, pp. 831-844 (Year: 2011).*

(Continued)

*Primary Examiner* — Cheyne D Ly
(74) *Attorney, Agent, or Firm* — Merchant & Gould

(57) ABSTRACT

Reductions in churn for assigning identifiers to entities in a knowledge graph enables several improvements to the functionality of the computing devices maintaining or accessing knowledge graphs. As the aliases or other terms used to identify a given entity change in response to updates to the knowledge graph, the identifiers assigned to various entities may change. For example, two individual entities conflated as one node may be split into two or two nodes merged into one in response to an update, and existing identifiers should be used to reduce churn. To select the existing identifiers to assign to a given updated entity, the aliases are clustered with the updated entities and the unique modal prior identifier is assigned as the identifier for the updated entity. Higher orders of modality are used to ensure as many existing identifiers are used before creating new identifiers.

20 Claims, 9 Drawing Sheets

(56) References Cited

U.S. PATENT DOCUMENTS

2017/0098245 A1* 4/2017 Palanciuc ............. G06F 16/285

OTHER PUBLICATIONS

Pujara et al., "Generic Statistical Relational Entity Resolution in Knowledge Graphs*", In Journal of the Computing Research Repository, Jul. 2016, 9 pages.
Singh et al., "Large-Scale Cross-Document Coreference Using Distributed Inference and Hierarchical Models", In Proceedings of the 49th Annual Meeting of the Association for Computational Linguistics: Human Language Technologies, Jun. 19, 2011, 11 pages.
Rao et al., "Entity Linking: Finding Extracted Entities in a Knowledge Base", In Publication of Springer Berlin Heidelberg, Jul. 12, 2012, pp. 1-21.
Hsiung et al., "Alias Detection in Link Data Sets", In Proceedings of the International Conference on Intelligence Analysis, vol. 4, Issue 4, May 2005, 6 pages.
Dalton, Jeffrey, "Entity-Based Enrichment for Information Extraction and Retrieval", In Doctoral Dissertation of University of Massachusetts Amhers, May 2014, 172 pages.
Pershina, Maria, "Graph-Based Approaches to Resolve Entity Ambiguity", In Doctoral Dissertation of New York University, May 2016, 94 pages.

* cited by examiner

REDUCING CHURN IN KNOWLEDGE GRAPHS

BACKGROUND

Knowledge graphs include nodes representing entities and edges running between nodes that represent interactions or relations between the nodes. For example, a knowledge graph may include a node for the person "Albert Einstein", a node for the paper "The Foundation of the General Theory of Relativity", and an edge representing authorship runs between the two nodes, indicating that Albert Einstein has the relationship of author for the paper on General Relativity. A given node may contain several aliases for the entity that it represents (e.g., "Albert Einstein" and "A. Einstein") that enable a search engine or query to locate a given node by various terms. Aliases are clustered at various nodes based on the contexts from which they are learned, but as new entities are discovered, maintaining proper alias-to-entity relations becomes increasingly difficult, and mistakes are made and corrected in successive classifications; resulting in churn in relationships in the knowledge graph. For example, another "A. Einstein" (e.g., Amy, Alexander, Alicia, etc., Einstein) may be tracked in the knowledge graph, and over successive constructions of the knowledge graph the two Einsteins may be treated as the same or separate entities and the related entities to one Einstein may be associated erroneously with the other; degrading the functionality of search engines using the knowledge graph and wasting computing resources.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems and methods are described herein to reduce churn in a knowledge graph. High churn reduces the consistency of the results provided from a knowledge graph as mentions are clustered, de-clustered, and re-clustered into entities, and associations among entities are formed or broken. Building the knowledge graph incrementally (determining whether to add a new mention to an existing entity or create a new entity) may reduce churn, but in the event of a miss-clustering (e.g., a mention of "A. Einstein" is associated with the node for "Albert Einstein", when the person in question is actually "Annabelle Einstein"), the knowledge graph may need to be rebuilt from its beginning state; sacrificing the computing resources that went into building the knowledge graph and creating a great deal of churn as the knowledge graph is rebuilt to avoid the miss-clustering.

To reduce churn and provide a reliable knowledge graph, each mention of an entity is provided a unique identifier. The various aliases are grouped into clusters that are associated with entities, and the association of a given alias to a given entity may change over time as new entities are created, existing entities are merged, and aliases reassigned among existing entities. In response to an update to the knowledge graph, the entity identifier that is most frequently associated with aliases clustered together is chosen for the entity represented by the cluster. When two or more clusters share a most-frequent entity identifier, or when a given cluster has multiple entity identifiers that are equally most-frequent, various prioritizations ensure that churn is reduced.

By reducing the churn of identifiers used in a knowledge graph, the functionalities of computing systems that manage or use knowledge graphs are improved. For example, by maintaining identifiers for entities as the knowledge graph is updated, less of an updated knowledge graph needs to be stored separately from previous versions; conserving memory resources by maintaining a base graph and modifications rather than separate graphs. In another example, by reducing churn as the knowledge graph is updated, the user experience is improved to alert users to changes in relationships and membership in an entity as the graph is updated.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
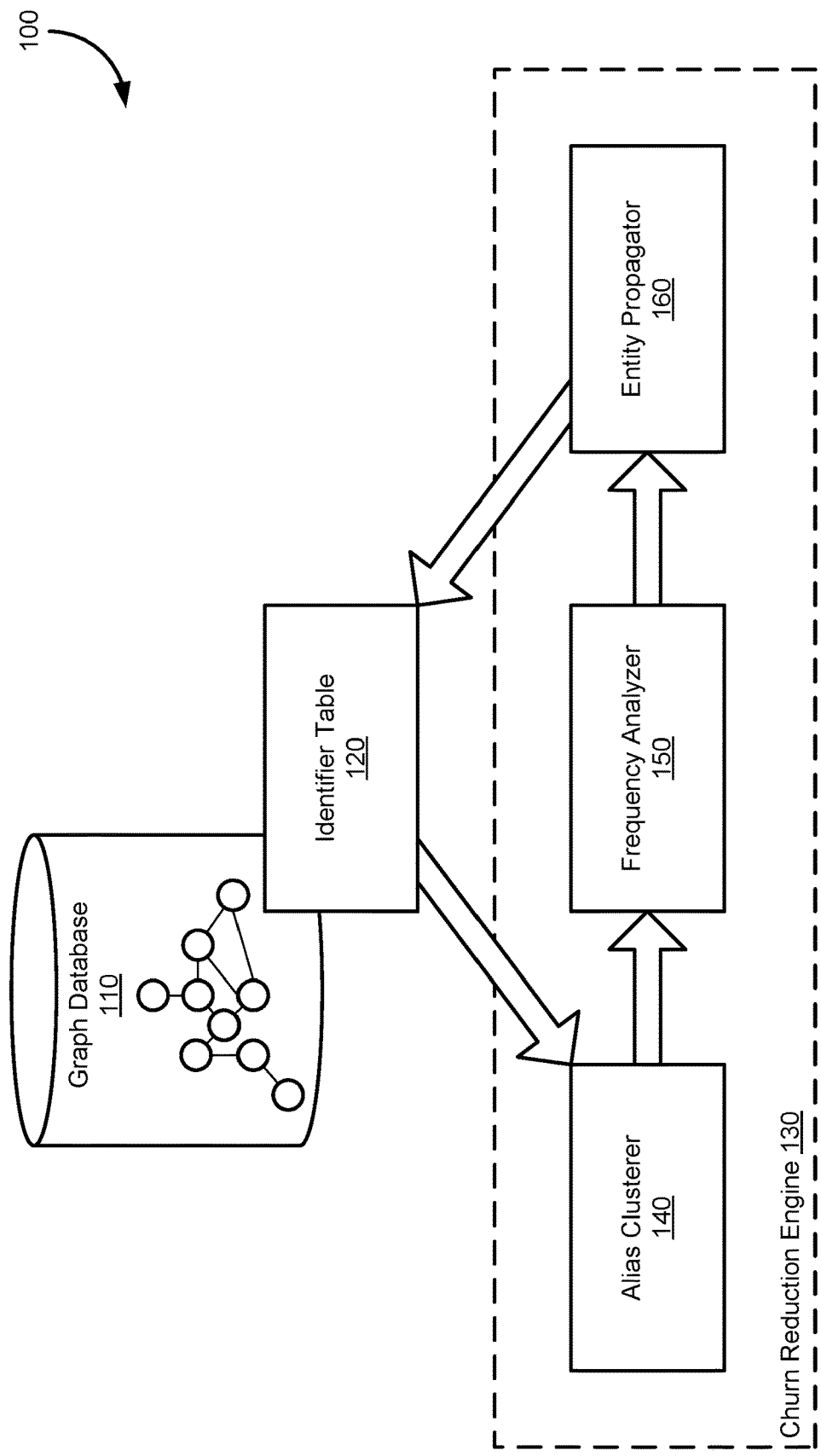
FIG. 1 illustrates an example operating environment in which the reduction of churn in a knowledge graph may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

FIG. 1 illustrates an example operating environment 100 in which the reduction of churn in a knowledge graph may be practiced. As illustrated, a graph database 110 maintains a knowledge graph for which an identifier table 120 is provided. The identifier table 120 maintains a list of aliases associated with various entities having unique identifiers. A churn reduction engine 130 is in communication with the identifier table 120 so that, in response to an update to the knowledge graph, the entity identifiers used for various entities remain as close as possible to the assignment scheme used before the update relative to the aliases. The illustrated sub-structures of the churn reduction engine 130 include an alias clusterer 140 in communication with the identifier table 120, a frequency analyzer 150 in communication with the alias clusterer 140, and an entity propagator 160 in communication with the frequency analyzer 150 and the identifier table 120.

The graph database 110 and churn reduction engine 130 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 4-6.

While the graph database 110 and churn reduction engine 130 are shown remotely from one another for illustrative purposes, it should be noted that several configurations of one or more of these devices hosted locally to another illustrated device are possible, and each illustrated device may represent multiple instances of that device wherein the graph database 110 may represent multiple devices used to a distributed knowledge graph, and the churn reduction engine 130 may represent multiple devices used to handle entity identifier assignment with reduced churn in parallel on one knowledge graph. Various servers and intermediaries familiar to those of ordinary skill in the art may lie between the component systems illustrated in FIG. 1 to route the communications between those systems, which are not illustrated so as not to distract from the novel aspects of the present disclosure.

The graph database 110 provides one or more knowledge graphs to represent various relations between entities. In a knowledge graph, entities are presented as nodes and relationships between those entities are presented as edges in a view of the knowledge graph maintained by the graph database. A knowledge graph includes nodes describing entities and a set of accompanying properties of those entities, such as, for example, the names, titles, ages, addresses, etc. Each property can be considered a key/value pair—a name of the property and its value. In other examples, entities represented as nodes include documents, meetings, communication, etc., as well as edges representing relations among these entities, such as, for example, an edge between a person node and a document node representing that person's authorship, modification, or viewing of the document. The knowledge graph may be periodically queried by users via graph queries to learn about the relationships between entities. For example, a user may issue a graph query to find friends or contacts within a social network, the documents that a given user has interacted with, the users that a given document has been accessed by, the entities that satisfy various search criteria, etc. Examples of knowledge graphs include social media services, websites, enterprise directories, document management and collaboration services, etc.

The churn reduction engine 130 is configured to manage the assignment of entity identifiers to various nodes based on the entity identifiers associated previously with the aliases stored in the nodes. The churn reduction engine 130 is configured to work with various knowledge graphs, and does not require machine learning or other training to reduce churn in those knowledge graphs. In various aspects, the churn reduction engine 130 is operable to manage entity identifier assignment on a knowledge graph that is distributed across many systems, and multiple instances of the churn reduction engine 130 may be instantiated on multiple machines to parallelize the process. The reduction in churn described herein avoids needing to create incremental builds of the knowledge graph, and may employ best effort heuristics to reduce churn within a given timeframe or processor load.

The alias clusterer 140 is configured to group aliases together that refer to a given entity in the knowledge graph, which may be done periodically (e.g., every n days) or in response to an update to the knowledge graph. As a given entity may be referred to by several aliases in natural language, these aliases are tracked as mentions, with distinct mention identifiers, that are clustered together by the alias clusterer 140 with an assumed entity to which they refer. For example, Carnegie Melon University may be referred to by the aliases of: "Carnegie Melon University", "CMU", "Carnegie Melon", "Carnegie Institute of Technology", "Tartans", etc.; which may all be associated with the entity node representing Carnegie Melon University in the knowledge graph to enable natural language search to locate Carnegie Melon University by any one of its several aliases.

In a converse example, the University of Tennessee and the University of Texas may each be known by the alias of "UT". Different mentions of the alias "UT" will be associated with either the University of Tennessee or the University of Texas (in the present example) based on the context of the document in which the alias is mentioned to cluster it with other alias mentions for a given entity node. For example, a mention of "UT" may be clustered with the aliases for the entity of the University of Tennessee (e.g., "University of Tennessee", "Volunteers", "UTK") when the document in which "UT" is found includes references to Tennessee, was found on a website hosted by the University of Tennessee, includes authors who are related in the knowledge graph to the University of Tennessee, etc. In another example, the mention of "UT" may be clustered with the aliases for the entity of the University of Texas (e.g., "University of Texas", "Texas", "Longhorns") in response to a greater frequency at which "UT" is mentioned in connection with the University of Texas than other entities, a geographic connection associated with the mention (e.g., a mention observed in Texas versus in Tennessee), whether another alias for the entity has been used in the same source, etc. As will be appreciated, various contextual data and criteria are used by the alias clusterer 140 in various aspects, and the above are given as non-limiting examples.

Although example aliases are primarily discussed herein in terms of names, abbreviations, and nicknames for entities, other entity properties may also include aliases. In one aspect, an enterprise may make use of several phone numbers and variations thereof that are treated as aliases for a "phone number" property. For example, the phone number for a bursar's office and an admissions office may be treated as aliases for a University's phone number. In another example, an entity associated with the phone number "1-800-555-1234" may include aliases of: "1 (800) 555-1234" and "18005551234". In a further example, term may include its translations as aliases such that the aliases of "Apfel", "pomme", and "manzana" are provided for the entity representing apples. Aliases are used in a variety of contexts to refer to a given entity by a variety of designations.

The identifier table 120 of the graph database 110 is configured to maintain these mentions of aliases in association with entities from the knowledge graph, wherein each alias mention is associated in a cluster with an entity identifier for a node. In response to an update to the knowledge graph, a given alias mention may be moved to a different cluster by the alias clusterer 140. For example, it may be determined that the alias "UT" that was previously assigned to a cluster with "University of Tennessee" may be reassigned to a cluster with "University of Texas", or set to a new cluster with "University of Toledo" in response to an update to the knowledge graph.

To reduce churn in the assignment of entity identifiers in response to a re-clustering, the updated clusters are analyzed by the frequency analyzer 150 to determine the most frequent entity identifiers (i.e., the mode) associated with the aliases prior to the re-clustering. In various aspects, to resolve potential conflicts in one or more clusters sharing their most frequent entity identifiers, the n next-most-frequent entity identifiers (i.e., the subsequent order modes) are also determined. The most frequent entity identifier that was previously associated with the aliases is assigned by the entity propagator 160 to the updated cluster. In response to a conflict (e.g., multiple potential most-frequent entity identifiers for one cluster, multiple clusters sharing a given entity identifier as their most frequent), the entity propagator 160 is configured to resolve the conflict by assigning entity identifiers so that as few aliases as possible are assigned different entity identifiers in the knowledge graph and that as many existing identifiers are reused as possible. Examples of entity identifier assignment are discussed in greater detail in regard to FIGS. 2A-C.

Figure 2A:
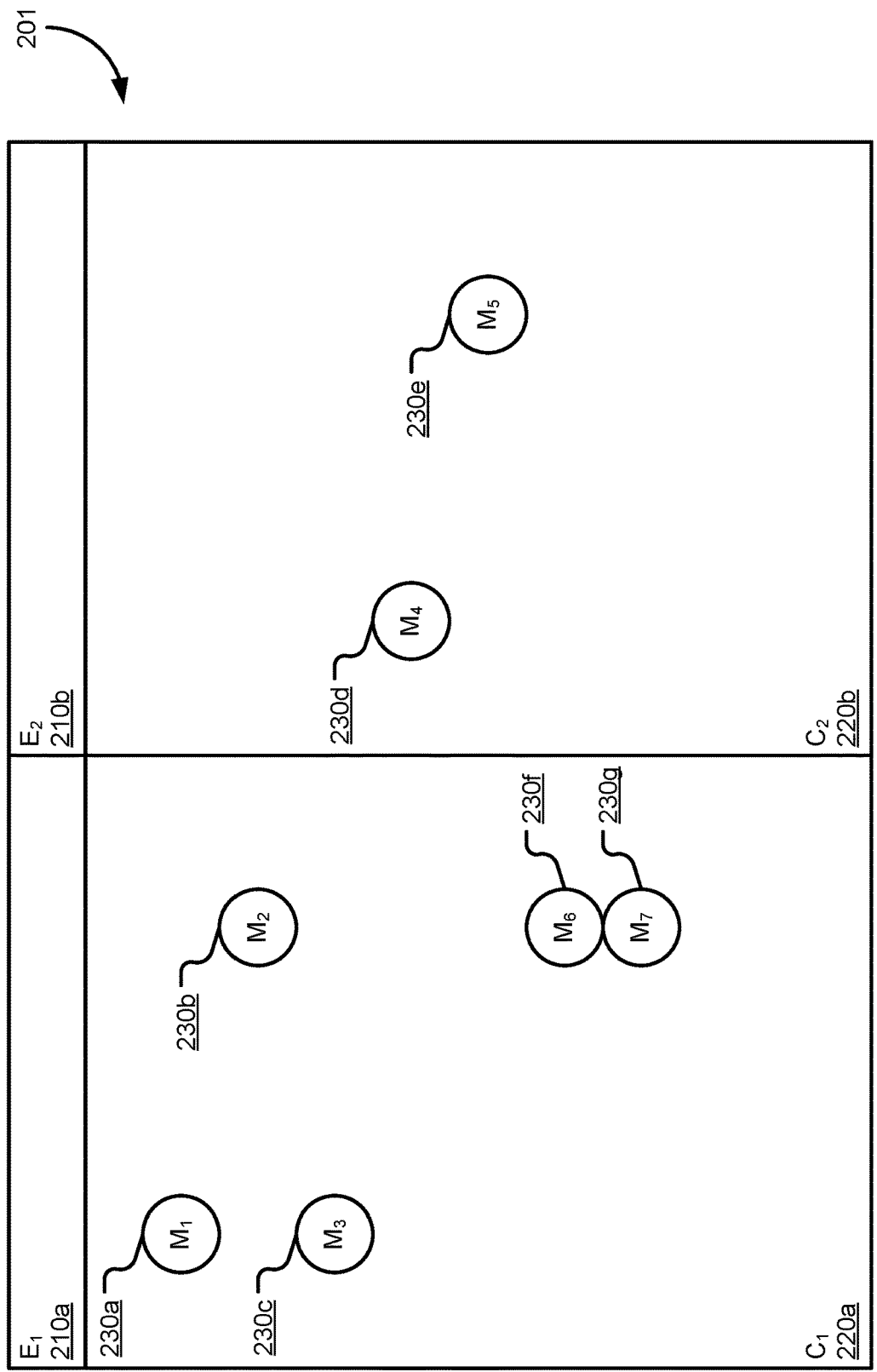
FIGS. 2A-C illustrate various states for an example identifier table having entity identifiers assigned to reduce churn in a knowledge graph.
Figure 2B:
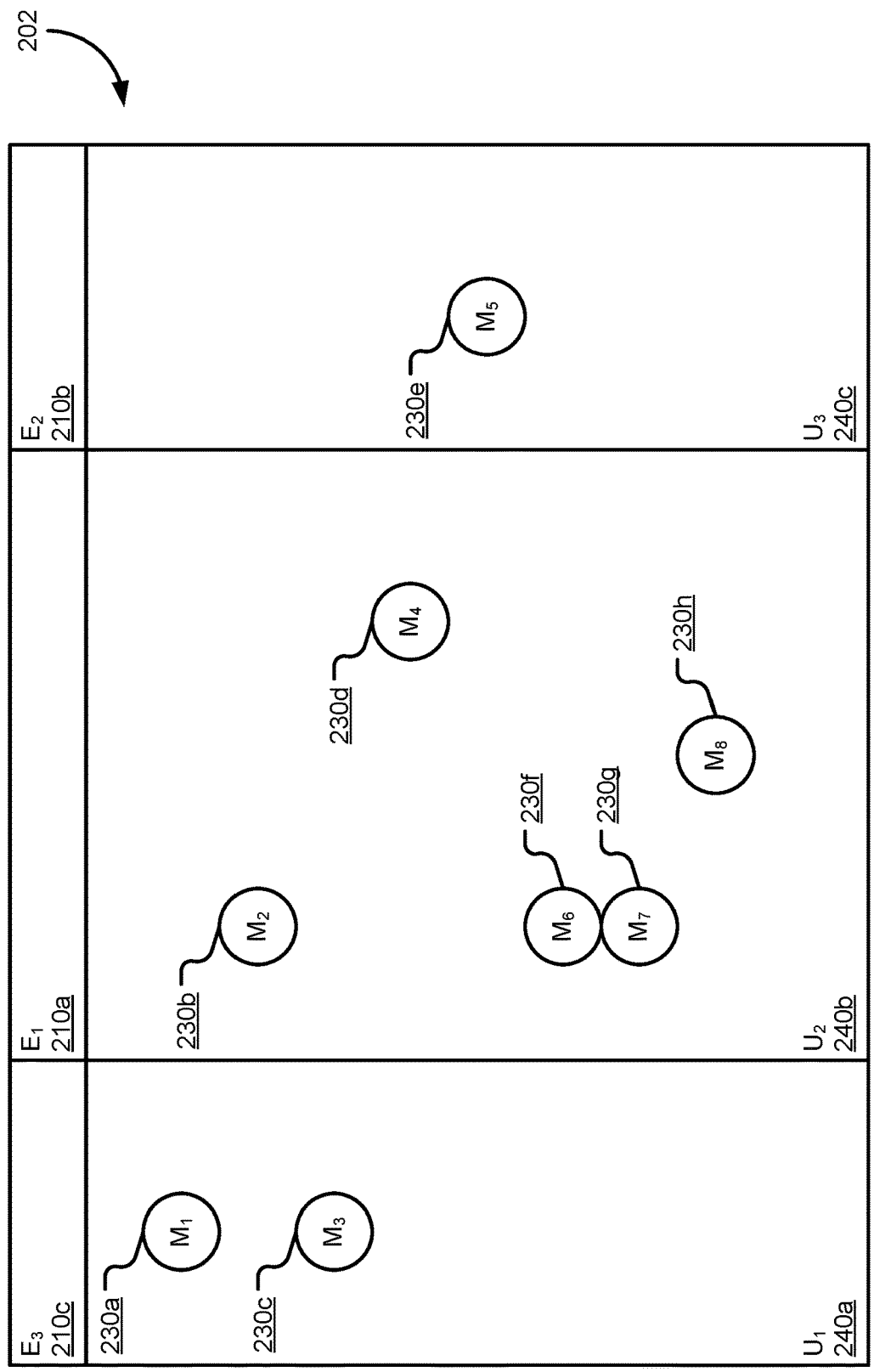
Figure 2C:
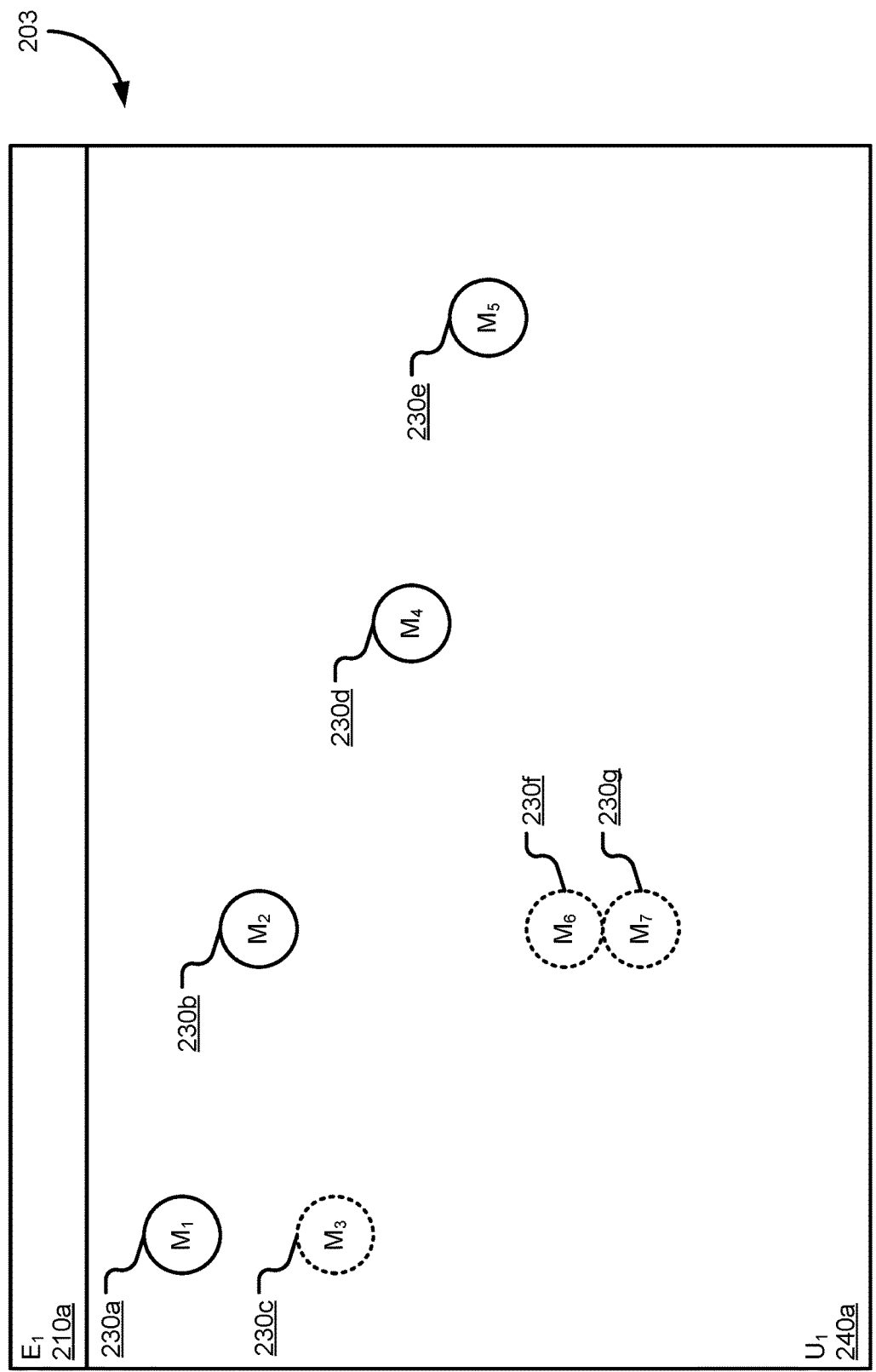

FIGS. 2A-C illustrate various states 201, 202, and 203 for an example identifier table 120 having entity identifiers assigned to reduce churn according to the churn reduction engine 130 in response to an update to the knowledge graph. FIG. 2A shows an initial state 201; FIG. 2B shows a separated state 202, based on the initial state 201; and FIG. 2C shows a merged state 203, based on the initial state 201.

In FIG. 2A, the initial state 201 shows two entities. The first entity is associated with a first entity identifier ($E_1$) 210a that is associated with a first cluster ($C_1$) 220a of several aliases, whose mention identifiers ($M_X$) 230 are associated with the first entity identifier ($E_1$) 210a. Similarly, the second entity is associated with a second entity identifier ($E_2$) 210b that is associated with a second cluster ($C_2$) 220b of several aliases, whose mention identifiers ($M_X$) 230 are associated with the second entity identifier ($E_2$) 210b. In FIG. 2A, the first mention identifier ($M_1$) 230a, second mention identifier ($M_2$) 230b, third mention identifier ($M_3$) 230c, sixth mention identifier ($M_6$) 230f, and seventh mention identifier ($M_7$) 230g are members of the first cluster ($C_1$) 220a, while the fourth mention identifier ($M_4$) 230d and fifth mention identifier ($M_5$) 230e are members of the second cluster ($C_2$) 220b.

FIG. 2B illustrates an example separated state 202 based on the initial state 201 shown in FIG. 2A, such as, for example, in response to an update to the knowledge graph. As shown in FIG. 2B, all of the prior mention identifiers 230 associated with aliases from FIG. 2A are present, as is an eighth mention identifier ($M_8$) 230h associated with a new alias. The eight mention identifiers 230 are grouped into three updated clusters ($U_X$) 240; first updated cluster ($U_1$) 240a, second updated cluster ($U_2$) 240b, and third updated cluster ($U_3$) 240c.

A given mention identifier 230 is placed in an updated cluster ($U_X$) 240 by the alias clusterer 140 independently of its prior membership in a pre-update cluster ($C_X$) 220; however, each mention identifier 230 retains the entity identifier ($E_X$) 210 that was assigned to its pre-update cluster ($C_X$) 220 for use by the frequency analyzer 150. Any newly added mention identifiers 230, such as the eighth mention identifier ($M_8$) 230h, will be associated with a null entity identifier (e.g., $E_{null}$). Based on the most frequently seen prior entity identifier 210 for the mention identifiers ($M_X$) 230 in the updated clusters 240, the entity propagator 160 attempts to assign the most-frequent entity identifier ($E_X$) 210 to the given updated cluster ($U_X$) 240. As will be appreciated, in response to a subsequent update to the knowledge graph, the updated clusters 240 will be treated as pre-update clusters 220.

As shown in FIG. 2B: the first updated cluster ($U_1$) 240a includes the first mention identifier ($M_1$) 230a and third mention identifier (M3) 230c; the second updated cluster ($U_2$) 240b includes the second mention identifier ($M_2$) 230b, fourth mention identifier ($M_4$) 230d, sixth mention identifier ($M_6$) 230f, seventh mention identifier ($M_7$) 230g, and eighth mention identifier ($M_8$) 230h; and the third updated cluster ($U_3$) 240c includes the fifth mention identifier ($M_5$) 230e. Accordingly, based on the entity identifiers 210 associated with mention identifiers 230 from their pre-update clusters 220: the first update cluster ($U_1$) 240a is associated with two references to the first entity identifier ($E_1$) 210a (via $M_1$ and $M_3$) and no references to other entity identifiers 210; the second update cluster ($U_2$) 240b is associated with three references to the first entity identifier ($E_1$) 210a (via $M_2$, $M_6$, and $M_7$), one reference to a null entity identifier ($E_{null}$) (via $M_8$), and one reference to the second entity identifier ($E_2$) 210b (via $M_4$); and the third update cluster ($U_3$) 240c is associated with one reference to the second entity identifier ($E_2$) 210b (via $M_5$).

In FIG. 2B the first entity identifier ($E_1$) 210a is assigned to the second updated cluster ($U_2$) 240b, the second entity identifier ($E_2$) 210b is assigned to the third updated cluster ($U_3$) 240c, and a newly created third entity identifier ($E_3$) 210c is assigned to the first updated cluster ($U_1$). The assignment of existing entity identifiers 210 is prioritized over the creation of new entity identifiers 210, but is balanced against the goal to reassign the entity identifiers 210 of as few as possible of the mention identifier 230 to reduce churn in the knowledge graph. Entity propagator 160 attempts to set the most frequent value (also referred to as the modal value) from each updated cluster 240 as the entity identifier 210 for that cluster to meet these goals, but is configured to handle collisions between multiple clusters attempting to be set to the same entity identifier 210. As illustrated in FIG. 2B, both the first updated cluster ($U_1$) 240a and the second updated cluster ($U_2$) 210b share the first entity identifier ($E_1$) 210a as their modes, resulting in a collision. Various collision resolution schemes may be employed in various aspects to balance the goals that as many existing entity identifiers 210 be reused as possible and that as few mention identifiers 230 be associated with different entity identifiers 210 between updates to the knowledge graph.

In the illustrated aspect, to resolve the collision, the first entity identifier ($E_1$) 210a is assigned to the second updated cluster ($U_2$) 240b instead of the first updated cluster ($U_1$) 240a because the second updated cluster ($U_2$) 240b includes more mention identifiers 230 that are associated with the first entity identifier ($E_1$) 210a than the second updated cluster ($U_2$) 240b includes ($M_2$, $M_6$, and $M_7$ versus $M_1$ and $M_3$). The subsequent order modal value (i.e., the next-most-frequent value) for the first updated cluster ($U_1$) 240a is then attempted to be set as its associated entity identifier 210, which in the illustrated example is the null entity ($E_{null}$), which results in a new entity identifier 210, the third entity identifier ($E_3$) 210c, being created and assigned to the first updated cluster ($U_1$) 240a.

FIG. 2C illustrates an example merged stated 203 based on the initial state 201 shown in FIG. 2A, such as, for example, in response to an update to the knowledge graph. In FIG. 2C, all seven of the mention identifiers 230a-g are included in the first updated cluster ($U_1$) 240a, which has been assigned the first entity identifier ($E_1$) 210a due to the first entity identifier ($E_1$) 210a being the most frequently associated value for the included mention identifiers 230a-g (five associations for $E_1$ versus two for $E_2$).

If, however, the third mention identifier ($M_3$) 230c, sixth mention identifier ($M_6$) 230f, and seventh mention identifier ($M_7$) 230g were not included in the first updated cluster ($U_1$) 240a (e.g., included in another updated cluster, removed from the knowledge graph), a multi-modal conflict occurs; more than one entity identifier 210 can be considered the most-frequent value for the updated cluster 240. In the present example with the three mention identifiers 230 removed, a multi-modal conflict exists between the first entity identifier ($E_1$) 210a (supported by $M_1$ and $M_2$) and the second entity identifier ($E_2$) 210b (supported by $M_4$ and $M_5$).

To resolve a multi-modal conflict, the entity propagator 160 may attempt to resolve any other assignments and collisions first or in coordination with the multi-modal conflict in light of the goal to reassign the entity identifiers 210 of as few as possible of the mention identifiers 230, thus reducing churn in the knowledge graph. For example, if another updated cluster 240 can also use either of the multi-modal conflicting entity identifiers 210 ($E_1$ or $E_2$), the first updated cluster ($U_1$) 240a will use the conflicting entity identifier 210 ($E_1$ or $E_2$) that the other updated cluster 240 does not use. In various aspects, the determination of which conflicting entity identifier ($E_1$ or $E_2$) to use may be based on the effects on other updated clusters 240. For example, if the most-frequent entity identifier ($E_r$) 210 for a second updated cluster ($U_2$) 240b is $E_1$ due to associations with n mention identifiers 230, and the most-frequent entity identifier ($E_x$) 210 for a third updated cluster ($U_3$) 240c is $E_2$ due to association with n+1 mention identifiers 230, the first updated cluster ($U_1$) will be associated with the conflicting second entity identifier ($E_2$) 210b, due to fewer mention identifiers 230 needing to be set to different entity identifiers (n+2 versus n+3). As will be appreciated, if n is greater than the number of mention identifiers 230 associated with the conflicted entity identifier 210 in the conflicted updated cluster 240, the conflicted updated cluster 240 will use its subsequent order modal value (i.e., the next-most-frequent value). In the example of FIG. 2C, the first updated cluster ($U_1$) 240a would use the null entity identifier ($E_{null}$) 210, and a new entity identifier 210 would be created and assigned to the first updated cluster 240a.

Figure 3:
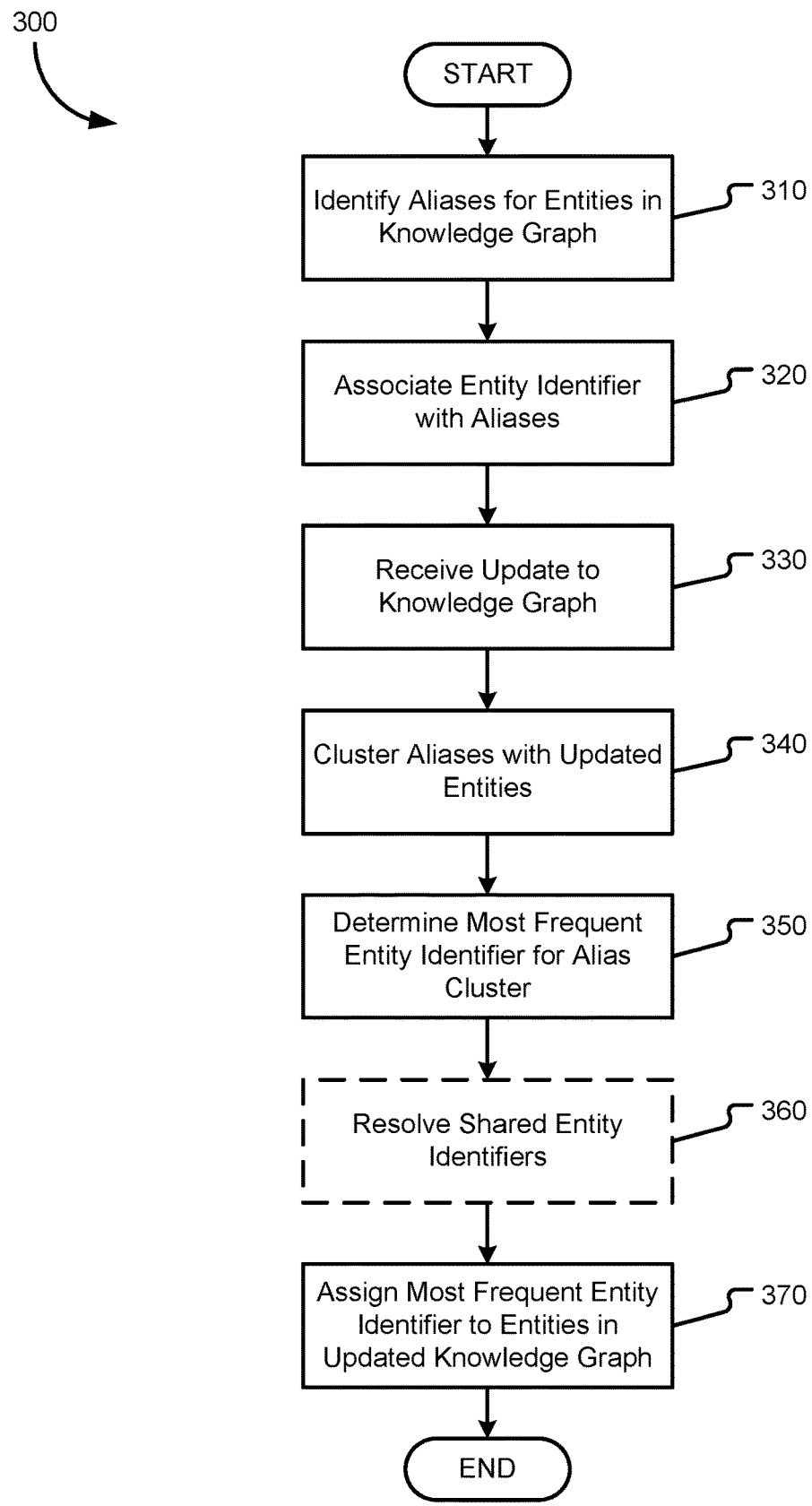
FIG. 3 is a flow chart showing general stages involved in an example method for reducing churn in identifier assignment in a knowledge graph.

FIG. 3 is a flow chart showing general stages involved in an example method 300 for reducing churn in identifier assignment in a knowledge graph. Method 300 begins with OPERATION 310 to identify aliases for entities in the knowledge graph. In various aspects, the aliases are stored as node properties for the nodes representing various entities in the knowledge graph, and may also be grouped into clusters in an identifier table 120. Method 300 proceeds to OPERATION 320, where the entity identifiers are associated with the aliases for the given entity with which they are associated. In various aspects, this association is stored in the identifier table 120 or as a subfield for the node properties of the aliases.

At OPERATION 330 an update to the knowledge graph is received. In various aspects, an update to the knowledge graph includes the addition of new data sources (e.g., new documents from which entities and relationships may be gleaned), the removal of existing data sources, or a command to reevaluate existing entities and relationships. In various aspects, because the knowledge graph may be spread across multiple devices and/or the CRE 130 may be run in parallel by several devices on the knowledge graph, a given update to the knowledge graph may be localized to one storage device and/or one CRE-executing device based on an associated node being implicated in the update (e.g., aliases potentially added or removed, edges potentially affected).

Proceeding to OPERATION 340, the aliases are re-clustered according to the update. In various aspects, a given alias is removed from its current entity's cluster and added to a new entity's cluster, is removed from its current entity's cluster and added to a different existing entity's cluster, is removed from all entity clusters, or is left associated with its current entity's cluster. The alias clusterer 140 determines which aliases to cluster together based on a variety of factors, including, but not limited to: a similarity of the aliases, contextual cues provided by other text surrounding the aliases in their data sources, geographic cues from where the data source was received, frequency cues for how often a given mention is used as an alias for a given entity, and manual input from a user.

At OPERATION 350 the clusters are analyzed to determine the most-frequent entity identifier associated with the clustered aliases from their prior clustering. When new aliases are added to the knowledge graph, those aliases are treated as being associated with a null entity identifier, as they do not have a prior associated with an entity. In various aspects, the most-frequent entity identifier for a cluster may include more than one entity identifier, resulting in a multi-modal conflict. For example, if the most-frequently associated entity identifier is identified as occurring n times in the cluster, and the two-entity identifier appear n times, a conflict exists in the cluster. In other aspects, the most-frequent entity identifier for a first cluster may also be the most-frequent entity identifier for a second cluster, resulting in a sharing conflict. For example, the most-frequent entity identifier associated with the aliases in a first updated cluster may be X, and the most-frequent entity identifier associated with the aliases in a second updated cluster may also be X. Method 300 optionally proceeds to OPERATION 360 in response to detecting a conflict for most-frequent entity assignment, otherwise, when no conflicts are detected, method 300 will proceed to OPERATION 370.

At OPERATION 360 any conflicts for the unique assignment of the most-frequent entity identifiers are resolved. Conflicts are resolved in heuristic best-effort analysis that attempts to change the entity identifier assignment of as few (existing) assignments as possible while reusing as many existing entity identifiers as possible across several clusters—including those that are not seen as being in conflict. For example, a first cluster shown in multi-modal conflict—where two or more entity identifiers qualify as the most-frequent entity identifier—may have entity identifier X and Y as its most-frequent entity identifiers and a second cluster may have entity identifier X as its most frequent entity identifier. In the present example, if the second cluster includes n aliases associated with entity identifier X and the first cluster includes n−1 or fewer aliases associated with identifier X, entity identifier X will be excluded as a potential entity identifier for the first cluster, thus resolving the multi-modal conflict and reducing churn in the knowledge graph.

In another example, to resolve a sharing conflict, the number of aliases associated with each most-frequent identifier is identified for each cluster, and the cluster with the greater number identified will keep the given most-frequent identifier and the other clusters will attempt to use their next-most-frequent identifiers as the most-frequent identifier. For example, if a first cluster and a second cluster both have entity identifier X as their most-frequent entity identifier and entity identifier Y as their next-most-frequent, and the first cluster has n aliases associated with entity identifier X from the pre-update cluster while the second cluster has n−1 aliases associated entity identifier X, the sharing conflict will be resolved such that the first cluster will use entity identifier X as its most frequent entity identifier and the second cluster will use entity identifier Y as its most frequent entity identifier.

In various aspects, the conflicts resolution process is run based on a number of aliases associated with the most frequent entity identifiers so that as conflicts are resolved, and new conflicts potentially introduced, churn is reduced. For example, when analyzing clusters for available entity identifiers to uniquely assign, the cluster with the largest number of aliases associated with its most-frequent entity identifier will be resolved first. In another aspect, weights are applied to the aliases based on how confident the alias clusterer 140 is that a given alias refers to a given entity so that the cluster with the highest confidence score has its conflicts resolved before clusters with lower confidence scores.

Proceeding to OPERATION 370, the most-frequent entity identifiers identified for the clusters are assigned to the aliases in the updated clusters. The aliases will use the assigned entity identifier in response to future updates to the knowledge graph. Method 300 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
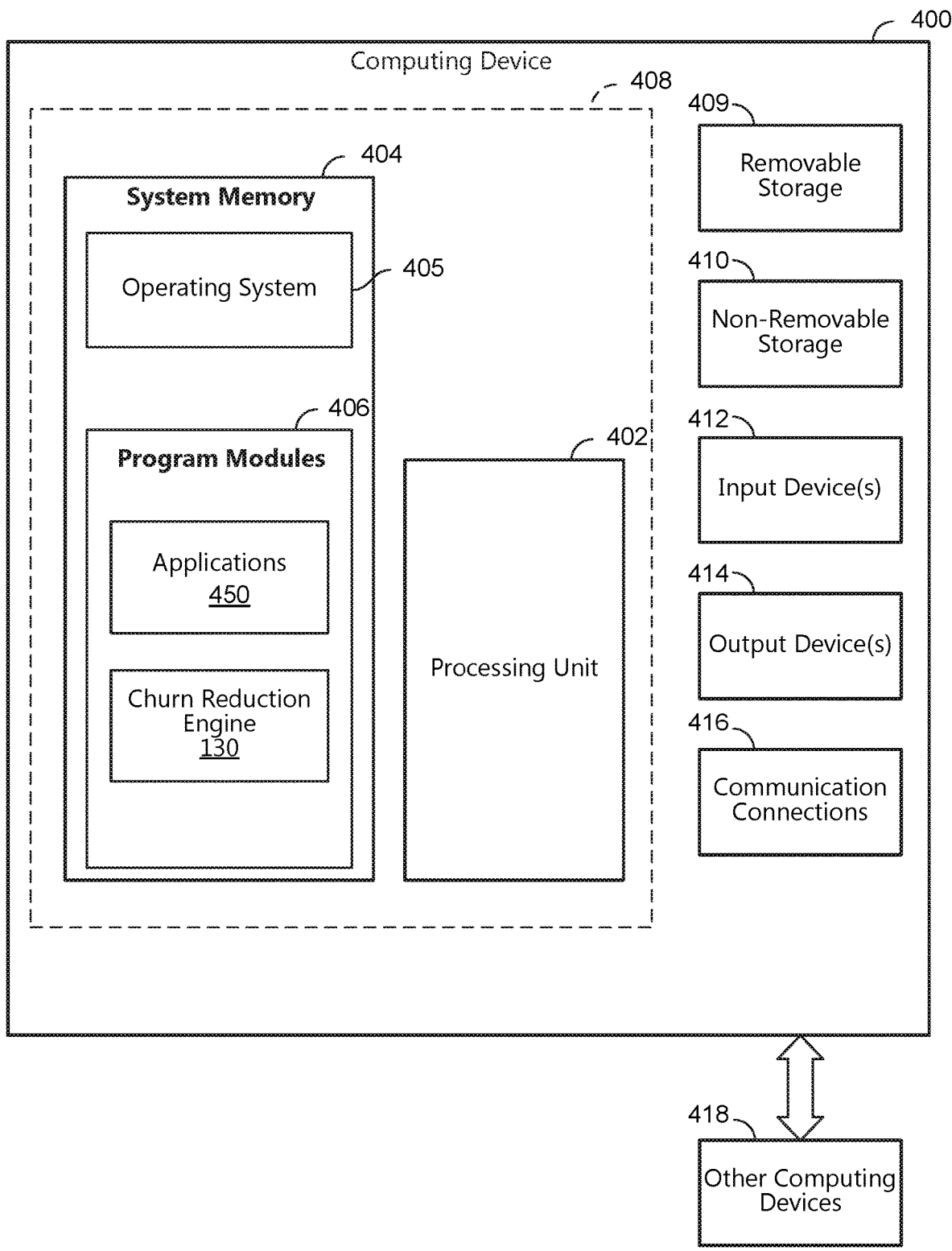
FIG. 4 is a block diagram illustrating example physical components of a computing device.
Figure 5A:
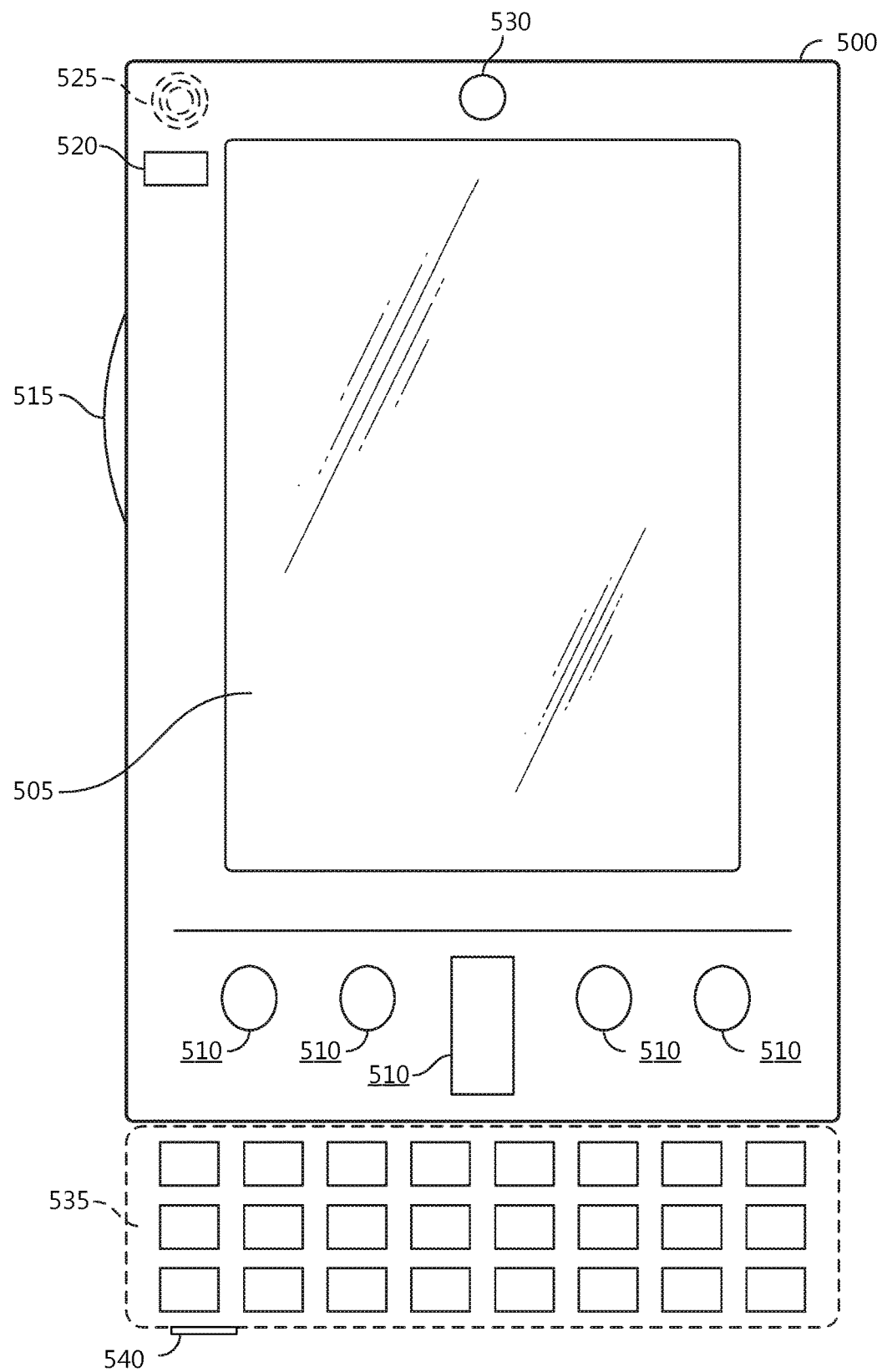
FIGS. 5A and 5B are block diagrams of a mobile computing device.
Figure 5B:
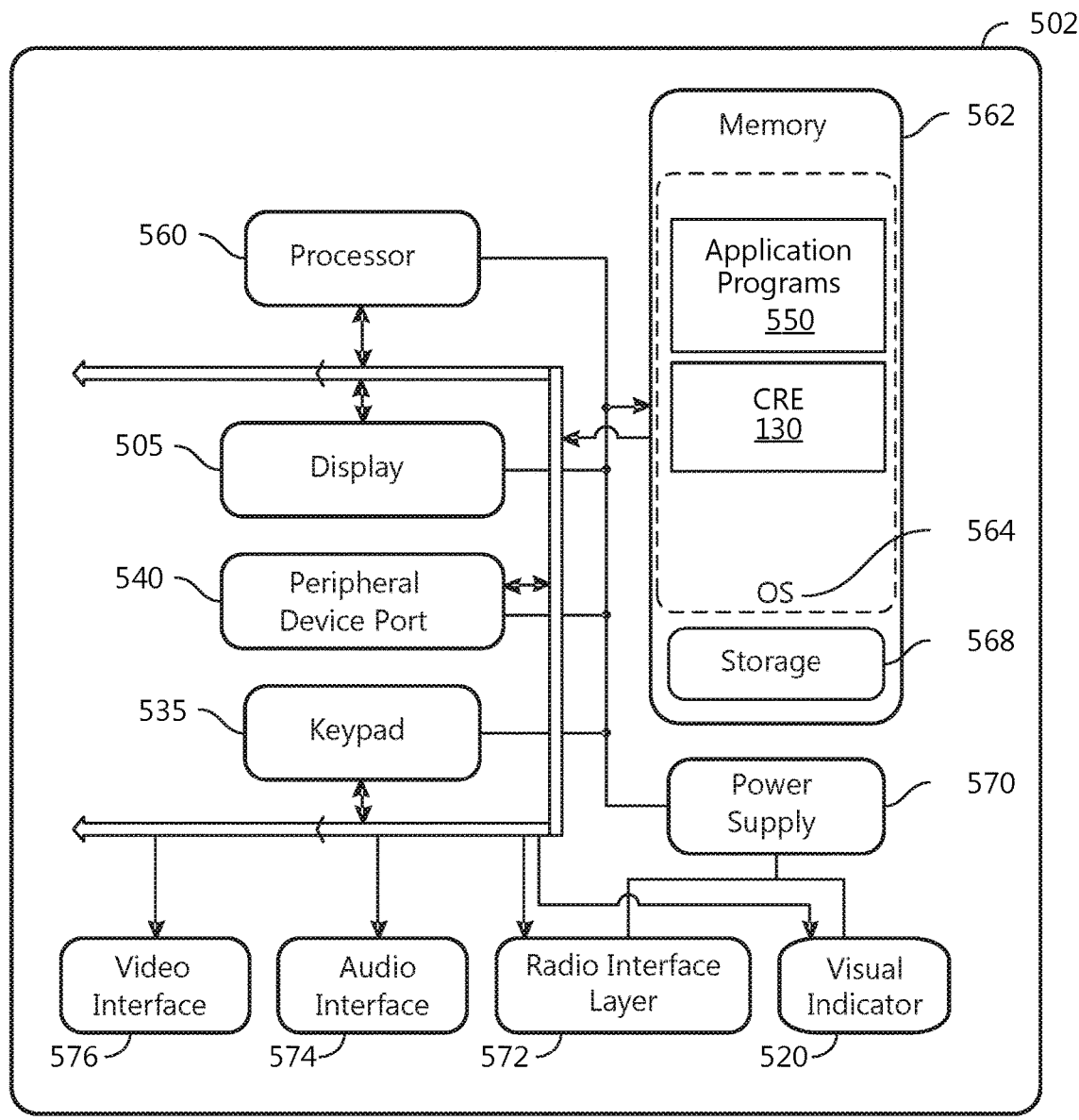
Figure 6:
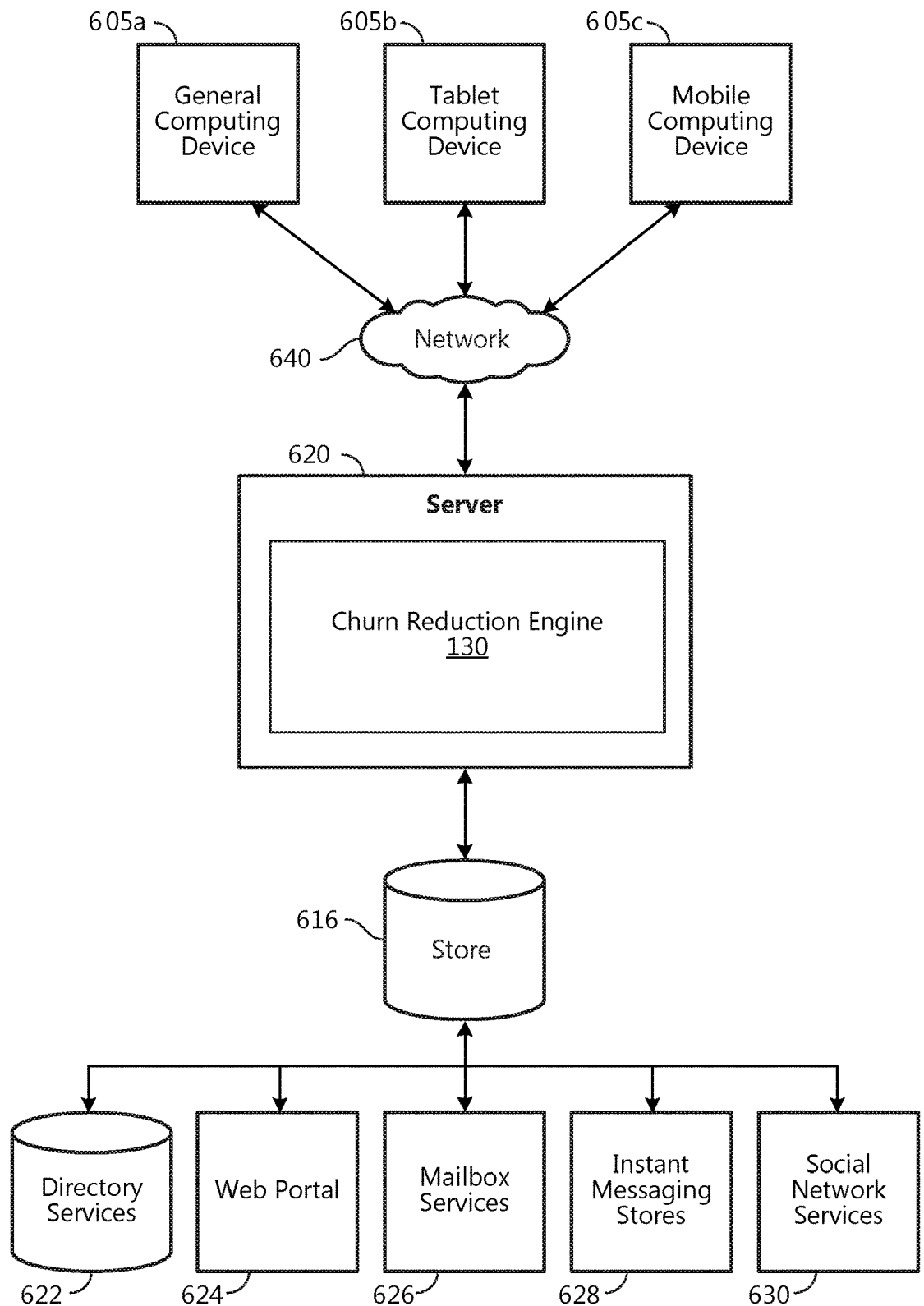
FIG. 6 is a block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the churn reduction engine 130. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., churn reduction engine 130) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used.

According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, churn reduction engine 130 (CRE) is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for reducing churn in a knowledge graph as described above. Content developed, interacted with, or edited in association with the churn reduction engine 130 is enabled to be stored in different communication channels or other storage types. For example, various documents may be stored using a directory service 622, a web portal 624, a mailbox service 626, an instant messaging store 628, or a social networking site 630. The churn reduction engine 130 is operative to use any of these types of systems or the like for reducing churn in a knowledge graph, as described herein. According to an aspect, a server 620 provides the churn reduction engine 130 to clients 605a,b,c. As one example, the server 620 is a web server providing the churn reduction engine 130 over the web. The server 620 provides the churn reduction engine 130 over the web to clients 605 through a network 640. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for reducing churn in identifier assignment for entities in a knowledge graph, comprising:
    identifying a plurality of aliases for a plurality of entities maintained in the knowledge graph, wherein each alias of the plurality of aliases is associated with one entity of the plurality of entities, and wherein each entity of the plurality of entities is associated with an entity identifier;
    for each alias of the plurality of aliases, associating the alias with the entity identifier for the entity to which the alias is associated; and
    in response to an update to the knowledge graph:
        clustering the plurality of aliases based on the update into a plurality of alias clusters, wherein each alias retains the association with the entity identifier made prior to the update; and
        for each alias cluster of the plurality of alias clusters, associating the alias cluster with one entity of the plurality of entities by assigning an entity identifier of the one entity to the alias cluster, wherein assigning the entity identifier of the one entity to the alias cluster comprises:
            identifying each unique entity identifier associated with aliases of the alias cluster;
            for each unique entity identifier, determining a number of the aliases associated with the entity identifier;
            identifying, as a most frequent entity identifier, one entity identifier among each unique entity identifier that has a highest determined number of the aliases associated; and
            assigning the most frequent entity identifier to the alias cluster and to the aliases of the alias cluster.

2. The method of claim 1, wherein the knowledge graph is maintained across multiple computing devices.

3. The method of claim 1, wherein if the one entity identifier is identified as the most frequent entity identifier for multiple alias clusters, further comprising:
for each of the multiple alias clusters, determine a number of aliases associated with the most frequent entity identifier;
determining the alias cluster that has a highest number of aliases associated with the most frequent entity identifier;
assigning the most frequent entity identifier to the alias cluster determined to have the highest number of aliases associated with the most frequent entity identifier; and
for each remaining alias cluster from the multiple alias clusters:
identifying, as a next-most frequent entity identifier, another entity identifier that has a next highest number of the aliases associated; and
assigning the next-most frequent entity identifier to the remaining alias cluster.

4. The method of claim 3, wherein the next-most frequent entity identifier is a null entity identifier, further comprising:
creating a new entity identifier; and
setting the new entity identifier as the next-most frequent entity identifier.

5. The method of claim 1, wherein if multiple entity identifiers among each unique entity identifier are determined to have the same highest number of the aliases associated, selecting one of the multiple entity identifiers to identify as the most frequent entity identifier.

6. The method of claim 5, wherein if one of the multiple entity identifiers is a null entity identifier, excluding the null entity identifier from selection.

7. The method of claim 5, wherein selecting one of the multiple entity identifiers to identify as the most frequent entity identifier further comprises:
determining whether a particular entity identifier of the multiple entity identifiers is identified as-the most frequent entity identifier of another alias cluster;
in response to determining that the particular entity identifier is identified as the most frequent entity identifier of another alias cluster, excluding the particular entity identifier from selection.

8. The method of claim 1, wherein the update to the knowledge graph includes:
adding new nodes to the knowledge graph;
removing existing nodes from the knowledge graph; and
adjusting edges between nodes in the knowledge graph.

9. A system for reducing churn in identifier assignment for entities in a knowledge graph, comprising:
a processor; and
a memory storage device including instructions that when executed by the processor are operable to:
maintain aliases in association with the entities from the knowledge graph, wherein each alias is associated in an alias cluster with an entity identifier; and
in response to an update to the knowledge graph:
produce a plurality of-updated alias clusters, wherein each alias retains the association with the entity identifier made prior to the update; and
for each updated alias cluster of the plurality of updated alias clusters, associate the updated alias cluster with one entity of the entities from the knowledge graph by assigning an entity identifier of the one entity to the updated alias cluster, wherein assigning the entity identifier of the one entity to the updated alias cluster comprises:
identifying each unique entity identifier associated with aliases of the updated alias cluster;
for each unique entity identifier, determining a number of the aliases associated with the entity identifier;
identifying, as a modal entity identifier of the updated alias cluster, one entity identifier among each unique entity identifier that has a highest determined number of the aliases associated; and
assigning the modal entity identifier to the updated alias cluster and to the aliases of the updated alias cluster.

10. The system of claim 9, wherein the system is configured in a distributed system to reduce churn in the knowledge graph as multiple instances operating in parallel.

11. The system of claim 9, wherein in response to identifying a multi-modal cluster in which multiple entity identifiers are identified as the modal entity identifier, the instructions when executed by the processor are further operable to:
determine whether the multiple entity identifiers are the modal entity identifier for other updated alias clusters; and
in response to determining that one of the multiple entity identifiers is not the modal entity identifier for the other updated alias clusters, assign the one of the multiple entity identifiers as the modal entity identifier for the updated alias cluster.

12. The system of claim 11, wherein in response to determining that at least two of the multiple entity identifiers are not the modal entity identifier for the other updated alias clusters, the instructions when executed by the processor are further operable to randomly select one of the at least two of the multiple entity identifiers as the modal entity identifier for the updated alias cluster.

13. The system of claim 11, wherein in response to determining that all of the multiple entity identifiers are the modal entity identifier for the other updated alias clusters, the instructions when executed by the processor are further operable to:
determine whether a number of aliases defining the modal entity identifier for a particular updated alias cluster of the other updated alias clusters is less than a number of aliases defining the modal entity identifier for the updated alias cluster;
in response to determining that the number of aliases defining the modal entity identifier for the particular updated alias cluster is less than the number of aliases defining the modal entity identifier for the updated alias cluster:
assign the modal entity identifier to the updated alias cluster,
determine a subsequent modal entity identifier for the particular updated alias cluster, and
assign the subsequent modal entity identifier as the modal entity identifier for the particular updated alias cluster; and
in response to determining that the number of aliases defining the modal entity identifier for the particular updated alias cluster is not less than the number of aliases defining the modal entity identifier for the updated alias cluster:
determine the subsequent modal entity identifier for the updated alias cluster, and
assign the subsequent modal entity identifier as the modal entity identifier for the updated alias cluster.

14. The system of claim 9, wherein, in response to the one entity identifier being identified as the modal entity identifier for multiple updated alias clusters, the instructions when executed by the processor are further operable to:
for each of the multiple updated alias clusters, determine a number of aliases associated with the one entity identifier;
determine an updated alias cluster of the multiple updated alias clusters having a highest determined number of aliases associated with the one entity identifier; and
assign the one entity identifier to the updated alias cluster.

15. The system of claim 14, wherein, in response to assigning the one entity identifier to the updated alias cluster, the instructions when executed by the processor are further operable to treat a subsequent order modal entity identifier for other updated alias clusters of the multiple updated alias clusters as the modal entity identifier.

16. The system of claim 15, wherein the subsequent order modal entity identifier is null, and the instructions when executed by the processor are further operable to:
create a new entity identifier; and
assign the new entity identifier as the modal entity identifier.

17. A computer readable storage device including instructions reducing churn in identifier assignment for entities in a knowledge graph that when executed by a processor in response to an update to the knowledge graph comprise:
clustering, based on the update, a plurality of entity aliases into a plurality of alias clusters, wherein each alias is associated with a pre-update entity identifier to which each alias was associated prior to the update; and
for each alias cluster of the plurality of alias clusters, associating the alias cluster with one entity in the knowledge graph by assigning an entity identifier of the one entity to the alias cluster, wherein assigning the entity identifier of the one entity to the alias cluster comprises:
identifying each unique entity identifier associated with aliases of the alias cluster;
for each unique entity identifier, determining a number of the aliases associated with the entity identifier;
identifying, as a most frequent entity identifier, one entity identifier among each unique entity identifier that has a highest determined number of the aliases associated; and
assigning the most frequent entity identifier to the alias cluster and the aliases of the alias cluster.

18. The computer readable storage device of claim 17, wherein, in response to determining multiple entity identifiers among each unique entity identifier have the same highest determined number of the aliases associated, selecting one of the multiple entity identifiers as the most frequent entity identifier based on:
whether the one of the multiple entity identifiers is identified as the most frequent entity identifier for other alias clusters;
whether the other alias clusters include a higher number of aliases associated with the one of the multiple entity identifiers than the alias cluster; and
whether the one of the multiple entity identifiers is a null entity identifier.

19. The computer readable storage device of claim 17, wherein in response to determining that multiple alias clusters of the plurality of alias clusters share the one entity identifier as the most frequent entity identifier, further comprising:
setting the most frequent entity identifier-for one alias cluster of the multiple alias clusters; and
for each alias of the multiple alias clusters aside from the one alias cluster:
identifying, as a next-most frequent entity identifier, another entity identifier; and
setting the next-most frequent entity identifier for the alias cluster.

20. The computer readable storage device of claim 19, wherein the one alias cluster of the multiple alias clusters is selected based on which alias cluster of the multiple alias clusters has a highest number of aliases associated with the most frequent entity identifier.

* * * * *